J. CLAYTON.
Wheel-Attachment for Plows.
No. 203,420. Patented May 7, 1878.
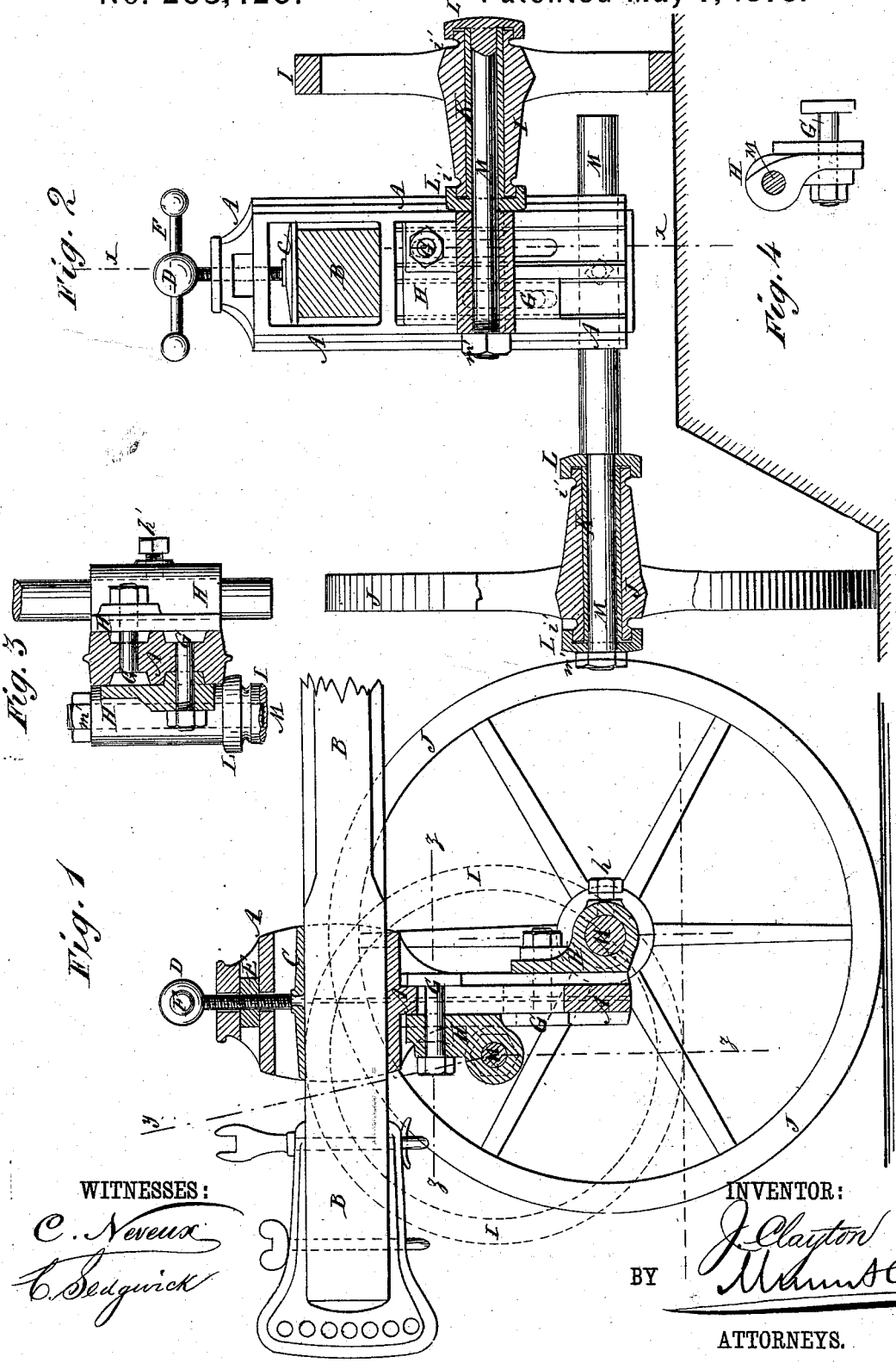
WITNESSES:
C. Neveux
C. Sedgwick
INVENTOR:
J. Clayton
BY Munn & Co
ATTORNEYS.

UNITED STATES PATENT OFFICE.

JOHN CLAYTON, OF THE GRANGE FARM, CLAYTON LAKE, (BRAINERD P. O.,) MINNESOTA.

IMPROVEMENT IN WHEEL ATTACHMENTS FOR PLOWS.

Specification forming part of Letters Patent No. 203,420, dated May 7, 1878; application filed February 27, 1878.

*To all whom it may concern:*

Be it known that I, JOHN CLAYTON, of the Grange Farm, Clayton Lake, (Brainerd P. O.,) in the county of Cass and State of Minnesota, have invented a new and Improved Wheel Attachment for Plows, of which the following is a specification:

Figure 1 is a vertical longitudinal section of my improved attachment, taken through the line $x\ x$, Fig. 2. Fig. 2 is a front view of the same, partly in section, through the line $y\ y$, Fig. 1. Fig. 3 is a detail horizontal section of the same, taken through the line $z\ z$, Fig. 1. Fig. 4 is a detail view of a modified form of one of the bearings.

Similar letters of reference indicate corresponding parts.

The object of this invention is to furnish an improved wheel attachment for plows which shall be so constructed that it may be easily adjusted for use with different kinds of plows, and to cut any desired width and depth of furrows, which will cause the plows to work at a uniform depth, and which will hold the plows to their work, so that they will require no attention from the plowman except when starting in at the beginning of a furrow.

The invention consists in the head-block, having a hole formed through its upper part to receive a plow-beam, and grooves and slots formed in its lower part, and provided with the plate and screw for clamping the plow-beam, and with the bolts and bearings for the wheel shafts or axles.

A is a head-block, in the upper part of which is formed a hole to receive the plow-beam B. In the upper part of the hole in the head-block A is placed a plate, C, to the center of which is swiveled the end of a screw, D. The screw D passes in through the top of the head-block A, and through a nut, E, placed in a hole in the top of the said head-block, so that the said head-block may be secured to and detached from the plow-beam B by turning the said screw D. To the upper end of the screw D is attached a lever or crank-handle, F, or a screw with a common square-head nut, for convenience in turning it. Upon the front and rear sides of the head-block A are formed two parallel longitudinal grooves, the sides of which are beveled, as shown in Figs. 2 and 3. The lower part of the head-block A is slotted in the bottom of its grooves to receive the bolts G, by which the bearings H are secured to the opposite sides of the said head-block. The heads of the bolts G are beveled upon their side edges to fit and slide in the grooves of the head-block A as the bearings H are raised and lowered. The bearings H are each made with a single rib upon their inner sides to fit into one of the grooves in the head-block A, and through which passes the bolt G, that secures the said bearing to the said head-block, so that each bearing H can slide up and down over the head of the bolt G, that secures the other bearing.

I is the smaller or land-side wheel, and J is the larger or furrow wheel, which may be made of cast-iron or wrought-iron or malleable cast-iron, or partly of wrought-iron and partly of cast-iron, or partly of wood and partly of iron, as desired, or as circumstances may require. The wheels I J are formed upon or attached to long hubs near one end. The hubs of the wheels I J fit and revolve upon metal or wooden tubes or sleeves K, which are made a trifle longer than the said hubs, and their ends rest against collars L, of wrought or malleable cast-iron or other metal, so as to give the said hubs a little play. The collars L have ring-flanges formed upon their inner sides to overlap the ends of the hubs and keep out dust and dirt. For the same purpose the hubs have ring-grooves $i$ formed around their ends at the edges of the flanges of the collars L, as shown in Fig. 2. In the case of the land-side wheel the inner collar L rests against the bearing H, and the outer collar L is formed solid upon the outer end of the shaft or axle M, which passes through the socket of the bearing H, and has a nut, $m'$, screwed upon its inner end; or both washers may be loose, and a head or nut may be formed or placed upon the outer end of the said shaft or axle M. In the case of the furrow-wheel both collars are loose. The inner collar L rests against a shoulder of the axle or shaft M, and the outer collar L is secured by a nut, $m'$, screwed upon the end of the said shaft or axle M. In this case the shaft or axle M may be made of solid wrought-iron or malleable cast-iron; or a wrought-iron bolt, with wrought-iron tube or sleeve passed over to form shoulder for collar, passes through the socket of the bearing H, and is secured in place adjustably by a set-screw, $h'$, passing in through the said bearing and resting against the said axle or shaft. With this construction either of the wheels I J may be raised and lowered, as the kind of plow to be used and the desired depth of furrow may require; and the wheel J may be adjusted, as the desired width of furrow may require, by moving its shaft or axle M in the socket of its bearing H. A further adjustment may be had by reversing the wheels upon their axles or shafts.

If desired, the bearing H for the shaft M of the smaller wheel I may be made reversed, or with the socket for the said shaft at its upper end, as shown in Fig. 4. This form is intended for use when deep furrows are required to be plowed.

Having thus fully described my invention, I claim as new and desire to secure by Letters Patent—

The head-block A, having a hole formed through its upper part to receive a plow-beam, and grooves and slots formed in its lower part, and provided with the plate C and the screw D for clamping the plow-beam, and with the bolts G and the bearings H for the wheel shafts or axles, substantially as herein shown and described.

JOHN CLAYTON.

Witnesses:
T. C. FERNOLD,
W. H. LOWE.